(12) United States Patent
Jeong et al.

(10) Patent No.: US 10,316,116 B2
(45) Date of Patent: Jun. 11, 2019

(54) OLEFIN-BASED POLYMER HAVING EXCELLENT MELT STRENGTH AND FILM INCLUDING THE SAME

(71) Applicant: LG CHEM, LTD., Seoul (KR)

(72) Inventors: Dong Hoon Jeong, Daejeon (KR); Heon Yong Kwon, Daejeon (KR); Yu Taek Sung, Daejeon (KR); Ki Soo Lee, Daejeon (KR); Dae Sik Hong, Daejeon (KR); Eun Young Shin, Daejeon (KR); Soon Ho Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/520,359

(22) PCT Filed: Dec. 2, 2015

(86) PCT No.: PCT/KR2015/013081
§ 371 (c)(1),
(2) Date: Apr. 19, 2017

(87) PCT Pub. No.: WO2016/093549
PCT Pub. Date: Jun. 16, 2016

(65) Prior Publication Data
US 2017/0320978 A1    Nov. 9, 2017

(30) Foreign Application Priority Data

Dec. 8, 2014 (KR) .......................... 10-2014-0174977
Dec. 1, 2015 (KR) .......................... 10-2015-0169813

(51) Int. Cl.
*C08F 210/16* (2006.01)
*C08J 5/18* (2006.01)
*B29D 7/01* (2006.01)
*C08F 10/14* (2006.01)
*C08F 10/08* (2006.01)
(Continued)

(52) U.S. Cl.
CPC .............. *C08F 10/14* (2013.01); *C08F 10/08* (2013.01); *C08F 210/16* (2013.01); *B29D 7/01* (2013.01); *C08F 4/65912* (2013.01); *C08F 4/65916* (2013.01); *C08F 210/02* (2013.01); *C08F 210/14* (2013.01); *C08F 2420/02* (2013.01); *C08F 2500/08* (2013.01);
(Continued)

(58) Field of Classification Search
None
See application file for complete search history.

(56) References Cited

U.S. PATENT DOCUMENTS 5,798,424 A    8/1998    Kong et al.
6,114,276 A    9/2000    Kong et al.
(Continued)

FOREIGN PATENT DOCUMENTS

JP         2999162 B2     1/2000
JP     2005-507961 A     3/2005
(Continued)

*Primary Examiner* — Richard A Huhn
(74) *Attorney, Agent, or Firm* — Dentons US LLP (57) ABSTRACT

Provided are an olefin-based polymer having excellent melt strength and a film including the same. The olefin-based polymer according to the present invention may have excellent processability, haze and mechanical properties, and in particular, high melt strength, thereby being usefully applied to films, etc.

7 Claims, 2 Drawing Sheets

(51) Int. Cl.
   *C08F 210/14* (2006.01)
   *C08F 210/02* (2006.01)
   *C08F 4/659* (2006.01)

(52) U.S. Cl.
   CPC ....... *C08F 2500/11* (2013.01); *C08F 2500/12* (2013.01); *C08F 2500/26* (2013.01); *C08J 5/18* (2013.01)

(56) References Cited

U.S. PATENT DOCUMENTS

| | | |
|---|---|---|
| 6,114,457 A | 9/2000 | Markel et al. |
| 6,147,180 A | 11/2000 | Markel et al. |
| 6,444,773 B1 | 9/2002 | Markel |
| 6,462,134 B1 | 10/2002 | Cecchin et al. |
| 6,660,809 B1 | 12/2003 | Weng et al. |
| 9,556,289 B2 | 1/2017 | Kwon et al. |
| 2003/0105251 A1* | 6/2003 | Crowther ............... C08F 210/16 526/127 |
| 2014/0011927 A1 | 1/2014 | Effler et al. |

FOREIGN PATENT DOCUMENTS

| | | |
|---|---|---|
| JP | 3752759 B2 | 12/2005 |
| KR | 10-0218046 B1 | 9/1999 |
| KR | 10-0223105 B1 | 10/1999 |
| KR | 10-2000-0070854 A | 11/2000 |
| KR | 10-2001-0053418 A | 6/2001 |
| KR | 10-2014-0009397 A | 1/2014 |
| KR | 10-2015-0066484 A | 6/2015 |
| KR | 10-1658172 B1 | 9/2016 |
| WO | 03-037938 A2 | 5/2003 |

* cited by examiner

OLEFIN-BASED POLYMER HAVING EXCELLENT MELT STRENGTH AND FILM INCLUDING THE SAME

CROSS-REFERENCE TO RELATED APPLICATION

This application is a National Stage Application of International Application No. PCT/KR2015/013081 filed on Dec. 2, 2015, which claims priority to and the benefit of priority of Korean Patent Application Nos. 10-2014-0174977 filed on Dec. 8, 2014, and 10-2015-0169813 filed on Dec. 1, 2015, all of which are hereby incorporated by reference in their entirety for all purposes as if fully set forth herein.

BACKGROUND OF THE INVENTION (a) Field of the Invention

The present invention relates to an olefin-based polymer having excellent melt strength, and a film including the same.

(b) Description of the Related Art

In general, a polymer film refers to a non-fibrous plate-shaped plastic molded article having a thickness of 0.25 mm (1/100 inch) or less. Since polymers are light, have a good barrier property and excellent transparency, and are relatively inexpensive, they are used in almost all fields such as packaging materials, household goods, automobiles, electronic devices, aircraft, etc. Further, polymers are easy to process, and therefore, polymer films are easily manufactured therefrom. In Korea and abroad, synthetic polymers such as polyethylene, polypropylene, polyvinyl chloride, polyethylene terephthalate, etc. have been developed and widely used in polymer films. Currently, many synthetic polymers are used alone or blended as film materials.

Particularly, polyethylene (PE) is divided into low-density polyethylene, high-density polyethylene, and linear low-density polyethylene according to its density and copolymerization, and kinds of branches, and recently, a variety of polyethylene products are also emerging in the commercialized metallocene catalyst system.

Low-density polyethylene was successfully synthesized in 1933 by ICI, and it has been used as an insulation material for military radar due to its noticeably excellent electrical properties. Low-density polyethylene is one of the general-purpose resins, of which application is expanded mainly from various packaging materials. Its major applications include general packaging, agriculture, shrink films, paper coating, etc. Especially, low-density polyethylene is suitable for coating applications because of its excellent melt strength due to long-chain branches.

Meanwhile, linear low-density polyethylene (LLDPE) is prepared by copolymerization of ethylene with alpha-olefin at a low pressure using a polymerization catalyst, and it is a resin having a narrow molecular weight distribution and short chain branches with a constant length, along with the lack of long chain branches. Linear low-density polyethylene films have high strength at break and elongation, and excellent tear strength and falling weight impact strength, in addition to general polyethylene characteristics, and therefore, their use is growing in the fields of stretch films, overwrap films, etc., to which the existing low-density polyethylene or high-density polyethylene has been hardly applied.

Meanwhile, a preparation process of linear low-density polyethylene using 1-butene or 1-hexene as a comonomer is generally performed in a single gas phase reactor or a single loop slurry reactor, and the process shows higher productivity than a process using 1-octene comonomers. However, due to limitations of catalyst and process technologies, the product has physical properties inferior to those of a product obtained by using 1-octene comonomers, and has a narrow molecular weight distribution to show poor processability. To address these process problems, an expensive fluorine-based processing aid is used, but it takes long time to stabilize, and loss of raw materials is significant, which is not economical.

Many efforts have been made to improve these problems, and for example, Korean Patent No. 218,046, Korean Patent No. 223,105, U.S. Pat. Nos. 5,798,424, 6,114,276, and Japanese Patent No. 2,999,162 report that a new magnesium-supported non-metallocene-based catalyst for olefin polymerization has a superior ability to control a molecular structure during olefin copolymerization, such as a comonomer distribution in polymer chains, a molecular weight distribution, etc., and thus it is able to synthesize a so-called "high-strength linear low-density polyethylene". They report that the high-strength linear low-density polyethylene has falling weight impact strength twice higher than that of films manufactured from general-purpose linear low-density polyethylene which is polymerized in the presence of a Ziegler-Natta catalyst, thereby showing high impact resistance characteristic. However, due to difficulties in the control of a molecular weight distribution in single reactor polymerization, high-strength linear low-density polyethylene has a typical narrow molecular weight distribution, causing a problem of poor processability. To improve this problem, there is an inconvenience that a mixture of the high-strength linear low-density polyethylene with a low-density polyethylene must be used in some cases.

Under this background, there is a continuous demand for a superior product having a balance between physical properties and processability, and improvement thereof is further required.

SUMMARY OF THE INVENTION

In order to solve the problems of the prior art, the present invention provides an olefin-based polymer having excellent melt strength and haze property, and improved processability while having a narrow molecular weight distribution, thereby exhibiting high productivity, and a film including the same.

To achieve the above objects, according to an embodiment of the present invention, provided is an olefin-based polymer, in which melt flow index (MI) measured at 190° C. under a load of 2.16 kg according to ASTM D1238 and melt strength (MS) satisfy the following Equation 1:

$$-32.0 * \log \text{MI} + 75.2 \leq \text{MS} \leq -40.9 * \log \text{MI} + 77.9 \qquad \text{[Equation 1]}$$

Further, according to another embodiment of the present invention, provided is a film including the olefin-based polymer.

The olefin-based polymer according to the present invention has excellent processability, haze and mechanical properties. In particular, the olefin-based polymer has an advantage in an extrusion process due to its high melt strength, and therefore, it may be usefully applied to films, etc.

DETAILED DESCRIPTION OF THE EMBODIMENTS

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof.

The present invention may be variously modified and have various forms, and specific examples of the present invention are explained in this description. However, it is not intended to limit the present invention to the specific examples and it must be understood that the present invention includes every modifications, equivalents, or replacements included in the spirit and technical scope of the present invention.

Hereinafter, an olefin-based polymer and a film including the same according to specific embodiments of the present invention will be described in detail.

According to an embodiment of the present invention, provided is an olefin-based polymer, in which melt flow index (MI) measured at 190° C. under a load of 2.16 kg according to ASTM D1238 and melt strength (MS) satisfy the following Equation 1:

$$-32.0*\log \text{MI}+75.2 \leq \text{MS} \leq -40.9*\log \text{MI}+77.9 \quad \text{[Equation 1]}$$

It was found that the olefin-based polymer of the present invention satisfies Equation 1, and therefore, physical properties thereof may be optimized to achieve high melt strength, excellent processability, and good mechanical properties, thereby completing the present invention.

Polyethylene films are one of important polymer products. Of polyethylene films, a linear low-density polyethylene (mLLDPE) prepared by using a metallocene catalyst exhibits very excellent physical properties, compared with other polymers having similar molecular weights. However, mLLDPE has a disadvantage that it has poor processability due to a narrow molecular weight distribution and a relatively uniform branched chain distribution according to a molecular weight. For this reason, a processing load is increased by a pressure applied to a resin during an extrusion process, and surface roughness is generated during a blowing process to deteriorate optical properties such as haze, etc. To improve these problems, mLLDPE may be used by mixing with a low density polyethylene (LDPE) having a broad molecular weight distribution and long chain branches, which may also cause inconvenience in the process.

Accordingly, the present invention provides an olefin-based polymer having higher melt strength at the same molecular weight or melt index than commercially available linear low-density polyethylene. Further, the olefin-based polymer exhibits higher melt strength at the same molecular weight distribution. Therefore, it is possible to simultaneously achieve improvement of processability, excellent haze property, and high melt strength at a narrow molecular weight distribution.

Melt strength is an important factor that influences processability and productivity of a film. High melt strength may result in good bubble stability during an extrusion process of a blown film, thereby improving processability of the film. Furthermore, it may be advantageous in terms of productivity.

As compared with general linear low-density polyethylene, the olefin-based polymer satisfying Equation 1 of the present invention exhibits equivalent physical strength while having a narrow molecular weight distribution and excellent melt strength, thereby showing improved processability.

When an olefin-based polymer having a similar melt flow index (MI) has too low or too high melt strength out of the range of Equation 1, processability or mechanical properties of a film may be deteriorated during an extrusion process.

According to an embodiment of the present invention, the olefin-based polymer may have a melt flow index (MI) of about 0.1 g/10 min to about 2 g/10 min, or about 0.1 g/10 min to about 1.8 g/10 min, or about 0.1 g/10 min to about 1.5 g/10 min, as measured at 190° C. under a load of 2.16 kg according to ASTM D1238. If the melt flow index is too high, long chain branches are not produced, and thus it is difficult to increase melt strength. If the melt flow index is too low, processability may be deteriorated. From this viewpoint, the above range is preferable.

Further, according to an embodiment of the present invention, the olefin-based polymer may have a melt flow rate ratio (MFRR, $\text{MI}_{21.6}/\text{MI}_{2.16}$) of about 10 to about 100, or about 20 to about 100, or about 20 to about 80, as measured at 190° C. according to ASTM D1238.

The olefin-based polymer of the present invention has melt strength (MS) of about 60 mN or more, for example, in the range of about 60 mN to about 150 mN, or about 60 mN to about 120 mN, or about 70 mN to about 150 mN, or about 70 mN to about 120 mN.

Further, the olefin-based polymer of the present invention may have a molecular weight distribution (a weight average molecular weight/a number average molecular weight) of 4 or less, for example, in the range of about 1 to about 4, or about 1 to about 3.5, or about 2 to about 3.5 when the melt strength (MS) is 70 m/N or more. In general, as a molecular weight distribution is broaden, melt strength is increased, but other physical strength of a polymer is weakened and the surface haze is increased due to an increase of a high molecular weight portion during extrusion of a blown film. However, since the olefin-based polymer of the present invention includes proper long chain branches, it has a narrow molecular weight distribution to exhibit high melt strength without deterioration of physical properties.

Additionally, the olefin-based polymer of the present invention may satisfy a predetermined relationship between melt strength and molecular weight distribution. For example, when the olefin-based polymer of the present invention has melt strength of 70 mN or more, it has a molecular weight distribution of 4 or less. More specifically, when the olefin-based polymer of the present invention has melt strength in the range from about 70 mN to about 150 mN, it has a molecular weight distribution in the range from about 1 to about 4. As described above, high melt strength is required for processability, and a narrow molecular weight distribution is required for physical strength. However, it is difficult to achieve high melt strength and a narrow molecular weight distribution at the same time, because the melt strength and the molecular weight distribution are proportional to each other in general olefin-based polymers. In contrast, the olefin-based polymer of the present invention has high melt strength of 70 mN while maintaining the molecular weight distribution of 4 or less, and therefore, the olefin-based polymer of the present invention has an advantage in that the incompatible physical properties may be realized at the same time.

Further, according to an embodiment of the present invention, the olefin-based polymer may have a density of about 0.910 g/cc to about 0.950 g/cc, or about 0.910 g/cc to about 0.930 g/cc, but is not limited thereto. When the olefin-based polymer has too high density of more than 0.950 g/cc, the probability of introducing long-chain branches is lowered, which is undesirable.

When the olefin-based polymer of the present invention has the melt flow index, the melt flow rate ratio, the melt strength, the density, and the molecular weight distribution within the above ranges while satisfying Equation 1, its physical properties may be more optimized, and thus excellent processability, haze and mechanical properties may be achieved.

The olefin-based polymer according to the present invention is preferably a copolymer of an olefin-based monomer, ethylene and an alpha olefin comonomer.

The alpha olefin comonomer may be alpha olefin having 3 or more carbon atoms. The alpha olefin having 3 or more carbon atoms may be propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-octadecene, 1-eicosene, etc.

Compared with the existing linear low-density polyethylene, the olefin-based polymer according to the present invention exhibits an equivalent level of physical strength while having excellent bubble stability due to high melt strength during an extrusion process. Therefore, the olefin-based polymer has excellent processability and haze property, and thus it may be usefully applied to films, etc.

An olefin-based polymer having the above-described characteristics according to the present invention may be obtained by copolymerization of ethylene and alpha olefin using a hybrid supported metallocene compound including two or more kinds of metallocene compounds having different structures as a catalyst, and this olefin-based polymer may have physical properties as described above.

More specifically, the above olefin-based polymer of the present invention may be obtained by polymerization of ethylene and alpha olefin comonomer in the presence of a hybrid supported catalyst including i) a first catalyst represented by the following Chemical Formula 1; and ii) one or more selected from the group consisting of a second catalyst represented by the following Chemical Formula 2 and a third catalyst represented by the following Chemical Formula 3:

[Chemical Formula 1]

wherein M is a Group 4 transition metal;
B is carbon, silicon, or germanium;
$Q_1$ and $Q_2$ are each independently hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;

$X_1$ and $X_2$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
$C_1$ is the following Chemical Formula 2a,
$C_2$ is the following Chemical Formula 2a or Chemical Formula 2b,

[Chemical Formula 2a]

[Chemical Formula 2b]

wherein $R_1$ to $R_{13}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl,
$R'_1$ to $R'_3$ are each independently hydrogen, halogen, $C_{1-20}$ alkyl, $C_{2-20}$ alkenyl, or $C_{6-20}$ aryl,

[Chemical Formula 2]

wherein $R_{10}$ to $R_{13}$ and $R'_{10}$ to $R'_{13}$ are each independently hydrogen, $C_{1-20}$ alkyl, $C_{2-20}$ alkenyl, $C_{6-20}$ aryl, $C_{7-20}$ alkylaryl, $C_{7-20}$ arylalkyl, $C_{2-20}$ alkoxyalkyl, or $C_{1-20}$ amine, or two or more neighboring groups of $R_{10}$ to $R_{13}$ and $R'_{10}$ to $R'_{13}$ are connected to each other to form one or more aliphatic rings, aromatic rings, or hetero rings, in which the aliphatic rings, aromatic rings, or hetero rings may be unsubstituted or substituted with $C_{1-20}$ alkyl;
Q is —$CH_2CH_2$—, —$C(Z_1)(Z_2)$— or —$Si(Z_1)(Z_2)$—;
$Z_1$ and $Z_2$ are each independently hydrogen, $C_{1-20}$ alkyl, $C_{3-20}$ cycloalkyl, $C_{1-20}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, or $C_{7-40}$ arylalkyl;
$M_2$ is a Group 4 transition metal;
$X_3$ and $X_4$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

[Chemical Formula 3]

wherein M₃ is a Group 4 transition metal;

$X_5$ and $X_6$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$R_{14}$ to $R_{19}$ are each independently hydrogen, $C_{1-20}$ alkyl, $C_{2-20}$ alkenyl, $C_{1-20}$ alkoxy, $C_{6-20}$ aryl, $C_{7-20}$ alkylaryl, $C_{7-20}$ arylalkyl, $C_{1-20}$ alkylsilyl, $C_{6-20}$ arylsilyl, or $C_{1-20}$ amine; or two or more neighboring groups of $R_{14}$ to $R_{17}$ are connected to each other to form one or more aliphatic rings, aromatic rings, or hetero rings;

$L_2$ is $C_{1-10}$ straight or branched alkylene;

$D_2$ is —O—, —S—, —N(R)— or —Si(R)(R')—, in which R and R' are each independently hydrogen, halogen, $C_{1-20}$ alkyl, $C_{2-20}$ alkenyl, or $C_{6-20}$ aryl;

$A_2$ is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl, or $C_{5-20}$ heteroaryl;

B is carbon, silicon, or germanium, and is a bridge connecting a cyclopentadienyl ligand and $JR19_{z-y}$ via a covalent bond;

J is an element in Group 15 or 16 of the periodic table;

z is the number of oxidation of J element; and y is the bonding number of J element.

The first catalyst represented by Chemical Formula 1 is characterized in that $C_1$(Chemical Formula 2a) is particularly substituted with a silyl group. Further, an indene derivative of $C_1$(Chemical Formula 2a) has a relatively low electron density, compared with an indenoindole derivative or a fluorenyl derivative, and includes a silyl group with a large steric hindrance. Therefore, due to steric hindrance effects and electron density factors, the catalyst may polymerize an olefin polymer having a relatively low molecular weight with high activity, as compared with a metallocene compound having a similar structure.

Moreover, the fluorenyl derivative which may be represented as in $C_2$(Chemical Formula 2b) may form a structure which is crosslinked by a bridge and have an unshared electron pair acting as a Lewis base in a ligand structure, thereby exhibiting a high polymerization activity.

Preferably, in Chemical Formula 1, M is zirconium, B is silicon, $Q_1$ and $Q_2$ are each independently $C_{1-20}$ alkyl or $C_{2-20}$ alkoxyalkyl, and $X_1$ and $X_2$ are halogen. More preferably, $Q_1$ is methyl, and $Q_2$ is 6-tert-butoxy-hexyl.

Preferably, in Chemical Formulae 2a and 2b, $R_1$ to $R_{13}$ are hydrogen and $R'_1$ to $R'_3$ are $C_{1-20}$ alkyl. More preferably, $R'_1$ to $R'_3$ are methyl.

A method of preparing the first catalyst will be specifically described in Examples below.

In the hybrid supported catalyst, the first catalyst represented by Chemical Formula 1 may mainly contribute to preparation of a copolymer having a high molecular weight and the catalyst represented by Chemical Formula 2 or Chemical Formula 3 may contribute to preparation of a copolymer having a relatively low molecular weight.

Preferably, in Chemical Formula 2, $R_{10}$ to $R_{13}$ and $R'_{10}$ to $R'_{13}$ are each independently hydrogen, $C_{1-20}$ alkyl or $C_{2-20}$ alkoxyalkyl, or two or more neighboring groups of $R_{10}$ to $R_{13}$ and $R'_{10}$ to $R'_{13}$ are connected to each other to form one or more aliphatic rings or aromatic rings, in which the aliphatic rings or the aromatic rings are unsubstituted or substituted with $C_{1-20}$ alkyl; Q is —CH₂CH₂—, —C($Z_1$)($Z_2$)— or —Si($Z_1$)($Z_2$)—; $Z_1$ and $Z_2$ are each independently $C_{1-20}$ alkyl or $C_{2-20}$ alkoxyalkyl; $M_2$ is zirconium; $X_3$ and $X_4$ are halogen.

More preferably, in Chemical Formula 2, $R_{10}$ to $R_{13}$ and $R'_{10}$ to $R'_{13}$ are each independently hydrogen, methyl, or 6-tert-butoxy-hexyl, or two or more neighboring groups of $R_{10}$ to $R_{13}$ and $R'_{10}$ to $R'_{13}$ are connected to each other to form one or more benzene rings or cyclohexane rings, in which the benzene rings are unsubstituted or substituted with tert-butoxy; Q is —CH₂CH₂—, —C($Z_1$)($Z_2$)—, or —Si($Z_1$)($Z_2$)—; $Z_1$ and $Z_2$ are each independently methyl or 6-tert-butoxy-hexyl; $M_2$ is zirconium; $X_3$ and $X_4$ are chloro.

Representative examples of the compound represented by Chemical Formula 2 are as follows:

-continued

A method of preparing the second catalyst will be specifically described in Examples below.

The third catalyst represented by Chemical Formula 3 may contribute to preparation of a copolymer having approximately middle molecular weight of the first catalyst and the second catalyst.

Preferably, in Chemical Formula 3, $M_3$ is titanium; $X_5$ and $X_6$ are halogen; $R_{14}$ to $R_{19}$ are $C_{1-20}$ alkyl; $L_2$ is $C_{1-10}$ straight or branched alkylene; $D_2$ is —O—; $A_2$ is $C_{1-20}$ alkyl; B is silicon; J is nitrogen; z is the number of oxidation of J element; and y is the bonding number of J element.

A representative example of the compound represented by Chemical Formula 3 is as follows:

A method of preparing the third catalyst will be specifically described in Examples below.

In the hybrid supported catalyst according to the present invention, a support including hydroxyl groups on the surface may be used as the support, and preferably, a support having highly reactive hydroxy and siloxane groups, from which moisture is removed by drying, may be used.

For example, silica, silica-alumina, silica-magnesia, etc. which is dried at a high temperature may be used, and they may commonly include oxides, carbonates, sulfates, or nitrates, such as $Na_2O$, $K_2CO_3$, $BaSO_4$, $Mg(NO_3)_2$, etc.

In the hybrid supported catalyst according to the present invention, a weight ratio of the catalyst: the support is preferably 1:1 to 1:1000. When the catalyst and the support are included within the above weight ratio, appropriate activity of the supported catalyst may be obtained, and therefore, it may be advantageous in terms of the activity maintenance and economy of the catalyst.

Further, a weight ratio of i) the first catalyst represented by Chemical Formula 1 and ii) one or more catalysts selected from the group consisting of the second catalyst represented by Chemical Formula 2 and the third catalyst represented by Chemical Formula 3 is preferably 1:100 to 100:1. The optimum catalytic activity is obtained within the above weight ratio, and thus it may be advantageous in terms of the activity maintenance and economy of the catalyst.

In addition to the above catalyst, a cocatalyst may be further used to prepare an olefin polymer. One or more of the cocatalyst compounds represented by the following Chemical Formula 4, Chemical Formula 5, and Chemical Formula 6 may be further included as the cocatalyst:

$$-[Al(R_{30})-O]_m-$$ [Chemical Formula 4]

wherein $R_{30}$ may be the same as or different from each other, and each independently halogen; hydrocarbon having 1 to 20 carbon atoms; or halogen-substituted hydrocarbons having 1 to 20 carbon atoms; and m is an integer of 2 or more, $$J(R_{31})_3$$ [Chemical Formula 5]

wherein $R_{31}$ is the same as defined in Chemical Formula 4; and

J is aluminum or boron;

$$[E-H]^+[ZA_4]^- \text{ or } [E]^+[ZA_4]^-$$ [Chemical Formula 6]

wherein E is neutral or cationic Lewis base;

H is a hydrogen atom;

Z is a Group 13 element; and

A may be the same as or different from each other, and each independently an aryl group having 6 to 20 carbon atoms or an alkyl group having 1 to 20 carbon atoms, in which one or more hydrogen atoms are substituted or unsubstituted with halogen, hydrocarbon having 1 to 20 carbon atoms, alkoxy or phenoxy.

Examples of the compound represented by Chemical Formula 4 may include methyl aluminoxane, ethyl aluminoxane, isobutyl aluminoxane, butyl aluminoxane, etc., and a more preferred compound is methyl aluminoxane.

Examples of the compound represented by Chemical Formula 5 may include trimethylaluminum, triethylaluminum, triisobutylaluminum, tripropylaluminum, tributyl aluminum, dimethyl chloro aluminum, triisopropyl aluminum, tri-s-butylaluminum, tricyclopentylaluminum, tripentylaluminum, triisopentylaluminum, trihexylaluminum, trioctylaluminum, ethyldimethyl aluminum, methyl diethyl aluminum, triphenyl aluminum, tri-p-tolylaluminum, dimethylaluminummethoxide, dimethylaluminumethoxide, trimethylboron, triethylboron, triisobutylboron, tripropylboron, tributylboron, etc., and a more preferred compound is selected from trimethylaluminum, triethylaluminum, and triisobutylaluminum.

Examples of the compound represented by Chemical Formula 6 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylb oron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenyl carboniumtetra(p-trifluoromethylphenyl) boron, triphenylcarboniumtetrapentafluorophenylboron, etc.

The hybrid supported catalyst according to the present invention may be prepared by the steps of supporting the cocatalyst compound on the support, supporting the first catalyst on the support, and supporting the second catalyst and/or the third catalyst on the support, in which the order of supporting the catalysts may vary as required.

Upon preparation of the hybrid supported catalyst, hydrocarbon solvents such as pentane, hexane, heptane, etc., or aromatic solvents such as benzene, toluene, etc. may be used as a reaction solvent. Further, the metallocene compound and the cocatalyst compound may be used in the form of being supported on silica or alumina.

The olefin-based polymer according to the present invention may be prepared by a method of including the step of polymerizing ethylene and alpha olefin-based monomer in the presence of the above-described hybrid supported catalyst.

Specific examples of the alpha olefin-based monomer may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, etc., and two or more thereof may be mixed and copolymerized.

A content of alpha olefin as a comonomer is not particularly limited, and it may be adequately selected according to the use or purpose of ethylene-alpha olefin polymer. More specifically, the content may be more than 0 mole % and 99 mole % or less.

The polymerization reaction may be performed by homopolymerization of single olefin-based monomers or by copolymerization of two or more kinds of monomers using a continuous slurry polymerization reactor, loop slurry reactor, gas phase reactor, or solution reactor.

The hybrid supported catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, a chlorine-substituted hydrocarbon solvent such as dichloromethane and chlorobenzene, etc. The solvent used herein may be preferably treated with a trace amount of alkyl aluminum to remove catalytic poisons such as water, air, etc. The polymerization may be also performed by further using the cocatalyst.

According to another embodiment of the present invention, provided is a film including the above-described olefin-based polymer.

As in the above-description of the olefin-based polymer, the film including the olefin-based polymer of the present invention exhibits an equivalent level of physical strength while having excellent bubble stability due to high melt strength during the extrusion process, compared with the existing linear low-density polyethylene. Therefore, the film has excellent processability and haze property, and thus it may be usefully applied to depending on a purpose of use.

According to an embodiment of the present invention, the film including the olefin-based polymer may have a haze of 20% or less, as measured at a thickness of 50 μm according to ISO 13468, and may exhibit excellent haze property of, for example, about 1% to about 20%, or about 1% to about 18%, or about 1% to about 15%.

The film of the present invention may be manufactured from the olefin-based polymer by, for example, an injection molding method, a compression molding method, an extrusion molding method, an injection-compression molding method, a foaming injection molding method, an inflation method, a T die method, a calendar method, a blow molding method, a vacuum molding method, etc. In addition, other processing methods generally used in the art to which the present invention pertains may be used without any particular limitation.

Hereinafter, the preferred Examples are provided for better understanding. However, the following Examples are provided for better understanding, and the invention is not intended to be limited by these Examples.

EXAMPLE

Synthesis Example of Metallocene Compound

Synthesis Example 1

Step 1) Preparation of Ligand Compound 4.05 g (20 mmol) of ((1H-inden-3-yl)methyl)trimethylsilane was injected into a dried 250 mL Schlenk flask (first flask) and dissolved in 40 mL of diethylether under argon atmosphere. After the mixture was cooled down to 0° C., 9.6 mL (24 mmol) of 2.5 M n-BuLi hexane solution was slowly added dropwise. The reaction mixture was gradually warmed up to room temperature, and then stirred for 24 hours. 2.713 g (10 mmol) of (6-tert-butoxyhexyl)dichloro(methyl)silane dissolved in 30 mL of hexane was prepared in another 250 mL Schlenk flask, and this mixture was cooled down to −78° C., and then the mixture of the first flask was slowly added dropwise thereto. After adding dropwise, the mixture was gradually warmed up to room temperature, and then stirred for 24 hours. 50 mL of water was added thereto and an organic layer was extracted three times with ether (50 mL×3). To the collected organic layer, an appropriate amount of MgSO$_4$ was added, stirred for a while, and filtered, and the solvent was dried under reduced pressure. As a result, 6.1 g (molecular weight: 603.11, 10.05 mmol, yield: 100.5%) of a ligand compound was obtained in the form of a yellow oil. The obtained ligand compound was used in the preparation of a metallocene compounds without an additional separation procedure.

$^1$H NMR (500 MHz, CDCl$_3$): 0.02 (18H, m), 0.82 (3H, m), 1.15 (3H, m), 1.17 (9H, m), 1.42 (H, m), 1.96 (2H, m), 2.02 (2H, m), 3.21 (2H, m), 3.31 (1H, s), 5.86 (1H, m), 6.10 (1H, m), 7.14 (3H, m), 7.14 (2H, m) 7.32 (3H, m)

Step 2) Preparation of Metallocene Compound

The ligand compound synthesized in Step 1 was added to a 250 mL Schlenk flask dried in an oven, and then dissolved in 4 equivalent weights of MTBE and 60 mL of toluene, to which 2 equivalent weights of n-BuLi hexane solution was added. After a lapse of one day, all solvent inside the flask was removed under a vacuum condition, and then the resultant was dissolved in an equal amount of toluene. One equivalent weight of ZrCl$_4$(THF)$_2$ was taken in a glove box and injected into a 250 mL Schlenk flask, to which toluene was added to prepare a suspension. The above two flasks were cooled down to −78° C., and then the lithiated ligand compound was slowly added to a toluene suspension of ZrCl$_4$(THF)$_2$. After completion of the injection, the reaction mixture was slowly warmed up to room temperature, stirred for one day, and allowed to react. Then, toluene in the mixture was removed to a volume of about ⅕ through vacuum-reduced pressure. Hexane of about 5 times volume of the remaining toluene was added thereto and recrystallized. The mixture was filtered without contacting with the outside air to give a metallocene compound. The resulting filter cake in the upper portion of the filter was washed using a small amount of hexane, and then weighed in glove box to identify the synthesis, yield and purity. As a result, 7.3 g (9.56 mmol, 95.6%) of a purple oil was obtained from 6.1 g (10 mmol) of the ligand compound, and stored in a toluene solution (purity: 100%, molecular weight: 763.23).

$^1$H NMR (500 MHz, CDCl$_3$): 0.03 (18H, m), 0.98, 1.28 (3H, d), 1.40 (9H, m), 1.45 (4H, m), 1.66 (6H, m), 2.43 (4H, s), 3.47 (2H, m), 5.34 (1H, m), 5.56 (1H, m), 6.95 (1H, m), 6.97 (1H, m), 6.98(1H, m), 7.22 (1H, m), 7.36 (2H, m), 7.43 (1H, m), 7.57 (1H, m)

Synthesis Example 2-1

A metallocene catalyst having the above structure (CAS No. 100163-29-9) was purchased from Sigma-Aldrich and used.

Synthesis Example 2-2

Step 1) Preparation of Ligand Compound 2.323 g (20 mmol) of indene was injected into a dried 250 mL Schlenk flask and 40 mL of MTBE was injected under argon atmosphere. After the mixture was cooled down to 0° C., 8 mL (20 mmol) of 2.5M n-BuLi hexane solution was slowly added dropwise. The reaction mixture was gradually warmed up to room temperature, and then stirred for 24 hours. 2.713 g (10 mmol) of (6-tert-butoxyhexyl)dichloro (methyl)silane and 30 mL of hexane were put in another 250 mL Schlenk flask, and this mixture was cooled down to −78° C., and then the above mixture was slowly added dropwise thereto. After adding dropwise, the mixture was gradually warmed up to room temperature, and then stirred for 24 hours. 50 mL of water was added thereto for quenching, and an organic layer was separated and dried over $MgSO_4$. As a result, 3.882 g (9.013 mmol, 90%) of a product was obtained.

NMR standard purity (wt %)=100%, Mw=430.70

$^1$H NMR (500 MHz, $CDCl_3$): −0.45, −0.22, −0.07, 0.54 (total 3H, s), 0.87 (1H, m), 1.13 (9H, m), 1.16-1.46 (10H, m), 3.25 (2H, m), 3.57 (1H, m), 6.75, 6.85, 6.90, 7.11, 7.12, 7.19 (total 4H, m), 7.22-7.45 (4H, m), 7.48-7.51 (4H, m)

Step 2) Preparation of Metallocene Compound

The ligand compound synthesized in Step 1 was added to a 250 mL Schlenk flask dried in an oven, and then dissolved in 4 equivalent weights of MTBE and 60 mL of toluene. 2.1 equivalent weights of n-BuLi hexane solution was added thereto, and subjected to lithiation for 24 hours, and then all solvent was removed under a vacuum-reduced pressure. Under a hexane solvent, the reaction product was filtered through a Schlenk filter to obtain only Li-salt (3.092 g, 6.987 mmol). In order to obtain a more pure catalyst precursor, purification was carried out. 2.1 equivalent weights of $ZrCl_4(THF)_2$ was taken in a glove box and injected into a 250 mL Schlenk flask, to which toluene was added to prepare a suspension. The above two flasks were cooled down to −78° C., and then the lithiated ligand compound was slowly added to the toluene suspension of $ZrCl_4(THF)_2$. The reaction mixture was gradually warmed up to room temperature and stirred for one day. Then, toluene in the mixture was removed through vacuum-reduced pressure. Hexane of a volume equivalent to the previous solvent was added thereto and recrystallized. The prepared hexane slurry was filtered under argon atmosphere, and both a filtered solid and a filtrate were subjected to vacuum-reduced pressure to evaporate a solvent. A remaining filter cake and a filtrate were identified through NMR, respectively, and then weighed in a glove box to identify the yield and purity.

From 3.1 g (6.987 mmol) of the ligand compound, 1.321 g (2.806 mmol, 40.2%) of a yellow oil was obtained and stored in a toluene solution (0.3371 mmol/mg).

NMR standard purity (wt %)=100%, Mw: 605.85

$^1$H NMR (500 MHz, $CDCl_3$): 0.88 (3H, m), 1.15 (9H, m), 1.17-1.47 (10H, m), 1.53 (4H, d), 1.63 (3H, m), 1.81 (1H, m), 6.12 (2H, m), 7.15 (2H, m), 7.22-7.59 (8H, m)

Synthesis Example 2-3

Step 1) Preparation of Ligand Compound 5.25 g (23.6 mmol) of 2-(6-tert-butoxyhexyl)cyclopenta-1,3-diene was injected into a dried 250 mL Schlenk flask, and 50 mL of methanol and 4 mL of acetone were injected, and the mixture was cooled down to 0° C. 2.95 mL (1.5 equivalent weights) of pyrrolidine was slowly added dropwise thereto. The reaction mixture was gradually warmed up to room temperature, and then stirred for 7 hours. 50 mL of water was added thereto for quenching, and an organic layer was separated and dried over $MgSO_4$. As a result, 5.0 g (19.07 mmol, 80.7%) of 2-(6-tert-butoxyhexyl)-5-(propaan-2-ylidene)cyclopenta-1,3-diene was obtained, and identified through NMR, and then dissolved in ether.

2.784 g (10 mmol) of 2,7-di-tert-butyl-9H-fluorene was injected into another 250 mL Schlenk flask, and made in a state of argon. 50 mL of ether was added under reduced pressure. After the mixture was cooled down to 0° C., 4.8 mL (12 mmol) of 2.5 M n-BuLi hexane solution was slowly added dropwise thereto. After gradually warmed up to room temperature, the reaction mixture was stirred for one day. The solution was added dropwise to the ether solution of 2-(6-tert-butoxyhexyl)-5-(propaan-2-ylidene)cyclopenta-1,3-diene previously prepared, and stirred for one day. 50 mL of water was added thereto for quenching, and an organic layer was separated and dried over $MgSO_4$, and then filtered to obtain a pure solution. All solvent was removed from the solution under vacuum-reduced pressure to obtain 5.0 g (9.36 mmol, 93.6%) of an oil.

NMR standard purity (wt %)=100%, Mw=540.86

$^1$H NMR (500 MHz, $CDCl_3$): 0.87 (1H, m), 0.99 (6H, m), 1.19 (9H, s), 1.30 (11H, s), 1.41 (11, s), 1.51-1.67 (5H, m), 3.00, 3.13 (1H, s), 3.35 (2H, m), 3.87, 4.05, 4.09, 4.11 (1H, s), 5.72, 5.97, 6.14, 6.61 (3H, s), 7.28 (1H, m), 7.35 (1H, m), 7.42 (1H, m), 7.58 (2H, m), 7.69 (2H, d)

Step 2) Preparation of Metallocene Compound

The ligand compound synthesized in Step 1 was added to a 250 mL Schlenk flask dried in an oven, and then dissolved in 4 equivalent weights of MTBE and toluene. 2.1 equivalent weights of n-BuLi hexane solution was added thereto, and subjected to lithiation for 24 hours. 2.1 equivalent weights of $ZrCl_4(THF)_2$ was taken in a glove box and injected into a 250 mL Schlenk flask, to which toluene was added to prepare a suspension. The above two flasks were cooled down to −78° C., and then the lithiated ligand compound was slowly added to the suspension of $ZrCl_4$ $(THF)_2$. The mixture was gradually warmed up to room temperature and stirred for one day. Then, ether in the mixture was removed to a volume of about ⅕ through vacuum-reduced pressure. Hexane of about 5 times volume of the remaining solvent was added thereto and recrystallized. The prepared hexane slurry was filtered under argon atmosphere, and both a filtered solid and a filtrate were subjected to vacuum-reduced pressure to evaporate a solvent. A remaining filter cake and a filtrate were identified through NMR, respectively, and then weighed in a glove box to identify the yield and purity. From 5.1 g (9.4 mmol) of the ligand compound, 4.4 g (6.3 mmol, 67.4%) of a brown solid was obtained.

NMR standard purity (wt %)=100%, Mw: 700.98

$^1$H NMR (500 MHz, $CDCl_3$): 1.17 (9H, s), 1.23-1.26 (6H, m), 1.27 (12H, s), 1.38 (6H, s), 1.40-1.44 (4H, m), 2.33 (3H, s), 2.36 (3H, s), 3.33 (2H, t), 5.31 (1H, m), 5.54 (1H, m), 5.95 (1H, m), 7.39 (1H, m), 7.58 (2H, m), 7.62 (1H, m), 7.70 (1H, s), 8.00 (1H, t)

Synthesis Example 2-4

Step 1) Preparation of Ligand Compound 1.162 g (10 mmol) of indene was injected into a dried 250 mL Schlenk flask (first flask) under argon atmosphere, and dissolved in co-solvents of 5 mL of ether and 40 mL of hexane. This solution was cooled down to 0° C., and 4.8 mL (12 mmol) of 2.5 M n-BuLi hexane solution was added dropwise thereto. The mixture was gradually warmed up to room temperature, and then stirred for one day. 2.713 g (10 mmol) of (6-tert-butoxyhexyl)dichloro(methyl)silane and 100 mL of hexane were injected into another 250 mL Schlenk flask (second flask), and cooled down to −78° C., and then added dropwise to the above prepared mixture of the first flask.

2.063 g (10 mmol) of 2-methyl-4-phenyl indene was injected into the other dried 250 mL Schlenk flask (third flask), and dissolved in 40 mL of ether. This solution was cooled down to 0° C., and then 4.8 mL (12 mmol) of 2.5 M n-BuLi hexane solution was added dropwise. This mixture was slowly warmed up to room temperature, and stirred for one day. 0.1 mol % of copper cyanide was added dropwise thereto, and then stirred for 1 hour. This mixture was added to the second flask and stirred for one day. 50 mL of water was added thereto for quenching, and worked up with ether to separate an organic layer, which was dried over $MgSO_4$. As a result, 5.53 g (10.61 mmol, 106.1%) of a brown oil product was obtained.

NMR standard purity (wt %)=100%, Mw: 520.82

$^1$H NMR (500 MHz, $CDCl_3$): −0.44, −0.36, −0.28, −0.19, 0.09-0.031 (total 3H, m), 0.84 (1H, m), 1.09 (9H, s), 1.23-1.47 (10H, m), 2.14 (3H, s), 3.25 (2H, m), 3.45 (2H, m), 6.38, 6.53, 6.88, 6.92 (total 2H, m), 6.93 (1H, m), 7.11-7.24 (2H, m), 7.28-7.32 (3H, m), 7.35 (2H, m), 7.44 (3H, m), 7.53 (2H, m)

Step 2) Preparation of Metallocene Compound

The ligand compound synthesized in Step 1 was added to a 250 mL Schlenk flask dried in an oven, and then dissolved in 4 equivalent weights of MTBE and toluene. 2.1 equivalent weights of n-BuLi hexane solution was added thereto, and subjected to lithiation for 24 hours. 2.1 equivalent weights of $ZrCl_4(THF)_2$ was taken in a glove box and injected into a 250 mL Schlenk flask, to which ether was added to prepare a suspension. The above two flasks were cooled down to −78° C., and then the lithiated ligand compound was slowly added to the suspension of $ZrCl_4$ $(THF)_2$. The mixture was gradually warmed up to room temperature and stirred for one day. Then, this mixture was subjected to vacuum-reduced pressure. The toluene solution was filtered under argon atmosphere to remove a solid filter cake, LiCl. A filtrate was subjected to vacuum-reduced pressure to remove toluene. Pentane of a volume equivalent to the previous solvent was added thereto and recrystallized. The prepared pentane slurry was filtered under argon atmosphere, and both a filtered solid and a filtrate were subjected to vacuum-reduced pressure to evaporate a solvent. A remaining filter cake and a filtrate were identified through NMR, respectively, and then weighed in a glove box to identify the yield and purity. As a result, 3.15 g (4.63 mmol, 46.3%) of the filter cake was obtained as an orange solid.

NMR standard purity (wt %)=100%, Mw: 680.93

$^1$H NMR (500 MHz, $CDCl_3$): 0.01 (3H, s), 0.89 (3H, m), 1.19 (9H, s), 1.26-1.33 (6H, m), 1.50 (4H, m), 2.06, 2.15, 2.36 (total 3H, m), 3.35 (2H, m), 3.66 (1H, s), 6.11-6.99 (3H, s), 7.13-7.17 (2H, m), 7.36-7.68 (10H, m)

Synthesis Example 2-5

(tert-Bu-O—$(CH_2)_6$)MeSi(9-$C_{13}H_9$)$_2$$ZrCl_2$

1) Preparation of Ligand Compound 1.0 mole of a Grignard reagent, tert-Bu-O—$(CH_2)_6$ MgCl solution was obtained from a reaction between tert-Bu-O—$(CH_2)_6$Cl compound and Mg(0) in a THF solvent. The Grignard reagent thus prepared was added to a flask containing a $MeSiCl_3$ compound (176.1 mL, 1.5 mol) and THF (2.0 mL) at −30° C., and stirred at room temperature for 8 hours or longer. Then, a filter solution was dried under vacuum to obtain a tert-Bu-O—$(CH_2)_6$$SiMeCl_2$ compound (yield: 92%).

Fluorene (3.33 g, 20 mmol), hexane (100 mL) and MTBE (methyl tert-butyl ether, 1.2 mL, 10 mmol) were added to a reactor at −20° C., and 8 ml of n-BuLi (2.5 M in Hexane) was slowly added thereto, followed by stirring at room temperature for 6 hours. After completing the stirring, the reactor was cooled down to −30° C., and the fluorenyl lithium solution thus prepared was slowly added over 1 hour to the solution of tert-Bu-O—$(CH_2)_6$ $SiMeCl_2$ (2.7 g, 10 mmol) dissolved in hexane (100 ml) at −30° C. After stirring at room temperature for 8 hours or longer, the solution was extracted by adding water, and evaporated to obtain a (tert-Bu-O—(CH$_2$)$_6$)MeSi(9-C$_{13}$H$_{10}$)$_2$ compound (5.3 g, yield: 100%). A structure of the ligand was identified by 1H-NMR.

1H NMR(500 MHz, CDCl$_3$): −0.35 (MeSi, 3H, s), 0.26 (Si—CH$_2$, 2H, m), 0.58 (CH$_2$, 2H, m), 0.95 (CH$_2$, 4H, m), 1.17(tert-BuO, 9H, s), 1.29(CH$_2$, 2H, m), 3.21(tert-BuO—CH$_2$, 2H, t), 4.10(Flu-9H, 2H, s), 7.25(Flu-H, 4H, m), 7.35(Flu-H, 4H, m), 7.40(Flu-H, 4H, m), 7.85(Flu-H, 4H, d).

2) Preparation of Metallocene Compound 4.8 ml of n-BuLi (2.5M in hexane) was slowly added to a (tert-Bu-O—(CH$_2$)$_6$)MeSi(9-C$_{13}$H$_{10}$)$_2$ (3.18 g, 6 mmol)/MTBE (20 mL) solution at −20° C. The solution was reacted for 8 hours or longer while raising temperature to room temperature. Then, the dilithium salt slurry solution thus prepared was slowly added to a slurry solution of ZrCl$_4$(THF)$_2$ (2.26 g, 6 mmol)/hexane (20 mL) at −20° C., and they were allowed to further react at room temperature for 8 hours. Precipitates were filtered and washed with hexane several times to obtain a red solid (tert-Bu-O—(CH$_2$)$_6$)MeSi(9-C$_{13}$H$_9$)$_2$ZrCl$_2$ compound (4.3 g, yield 94.5%).

1H NMR(500 MHz, C6D6): 1.15(tert-BuO, 9H, s), 1.26 (MeSi, 3H, s), 1.58 (Si—CH2, 2H, m), 1.66 (CH2, 4H, m), 1.91(CH2, 4H, m), 3.32(tert-BuO-CH2, 2H, t), 6.86 (Flu-H, 2H, t), 6.90 (Flu-H, 2H, t), 7.15 (Flu-H, 4H, m), 7.60 (Flu-H, 4H, dd), 7.64(Flu-H, 2H, d), 7.77(Flu-H, 2H, d)

Synthesis Example 3 tBu-O—(CH$_2$)$_6$)(CH$_3$)Si(C$_5$(CH$_3$)$_4$)(tBu-N)TiCl$_2$ 50 g of Mg(s) was added to a 10 L-reactor at room temperature, and then 300 mL of THF was added thereto. About 0.5 g of I$_2$ was added, and the reactor temperature was maintained at 50° C. After the reactor temperature was stabilized, 250 g of 6-t-buthoxyhexyl chloride was added to the reactor using a feeding pump at a rate of 5 mL/min. By adding 6-t-butoxyhexyl chloride, about 4 to 5° C. increase in the reactor temperature was observed. The mixture was stirred for 12 hours while continuously adding 6-t-butoxyhexyl chloride. 12 hours after reaction, a black reaction solution was obtained. 2 mL of the resulting black solution was taken and water was added thereto to obtain an organic layer, which was identified as 6-t-butoxyhexane by 1H-NMR. A successful Grignard reaction was confirmed from 6-t-butoxyhexane. Consequently, 6-t-buthoxyhexyl magnesium chloride was synthesized.

500 g of MeSiCl$_3$ and 1 L of THF were added to a reactor, and then the reactor temperature was cooled down to −20° C. 560 g of the synthesized 6-t-buthoxyhexyl magnesium chloride was added to the reactor at a rate of 5 mL/min using a feeding pump. After completing feeding of the Grignard reagent, the mixture was stirred for 12 hours while slowly raising the reactor temperature to room temperature. 12 hours after reaction, production of white MgCl$_2$ salts was observed. 4 L of hexane was added thereto, and salts were removed through labdori to obtain a filter solution. The filter solution thus obtained was added to the reactor, and then hexane was removed at 70° C. to obtain a light yellow liquid. The liquid thus obtained was identified as a desired methyl (6-t-buthoxy hexyl)dichlorosilane compound by 1H-NMR.

1H-NMR (CDCl$_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to a reactor, and then reactor temperature was cooled down to −20° C. 480 mL of n-BuLi was added to the reactor at a rate of 5 mL/min using a feeding pump. After addition of n-BuLi, the mixture was stirred for 12 hours while slowly raising the reactor temperature to room temperature. 12 hours after reaction, an equivalent weight of methyl(6-t-buthoxy hexyl)dichlorosilane (326 g, 350 mL) was rapidly added to the reactor. The mixture was stirred for 12 hours while slowly raising the reactor temperature to room temperature. Then, the reactor temperature was cooled down to 0° C., and then 2 equivalents of t-BuNH$_2$ were added. The mixture was stirred for 12 hours while slowly raising the reactor temperature to room temperature. 12 hours after reaction, THF was removed and 4 L of hexane was added thereto, and salts were removed through labdori to obtain a filter solution. The filter solution was added to the reactor, and then hexane was removed at 70° C. to obtain a yellow solution. The yellow solution thus obtained was identified as a methyl(6-t-buthoxyhexyl)(tetramethylCpH)t-Butylaminosilane) compound by 1H-NMR.

TiCl$_3$(THF)$_3$(10 mmol) was rapidly added to n-BuLi and the dilithium salt of the ligand at −78° C., which was synthesized from the ligand dimethyl(tetramethylCpH)t-butylaminosilane in the THF solution. The reaction solution was stirred for 12 hours while slowly raising temperature from −78° C. to room temperature. After stirring for 12 hours, an equivalent weight of PbCl$_2$ (10 mmol) was added to the reaction solution at room temperature, followed by stirring for 12 hours. After stirring for 12 hours, a dark black solution rendering a blue color was obtained. After THF was removed from the produced reaction solution, hexane was added to filter the product. After hexane was removed from the filter solution, the solution was identified by 1H-NMR as (tBu-O—(CH$_2$)$_6$)(CH$_3$)Si(C$_5$(CH$_3$)$_4$)(tBu-N)TiCl$_2$ which is a desired ([methyl(6-t-buthoxyhexyl)silyl(η5-tetramethylCp)(t-butylamido)]TiCl$_2$).

1H-NMR (CDCl$_3$): 3.3 (s, 4H), 2.2 (s, 6H), 2.1 (s, 6H), 1.8-0.8 (m), 1.4 (s, 9H), 1.2(s, 9H), 0.7 (s, 3H)

Preparation of Hybrid Supported Catalyst

Preparation Example 1

2.0 kg of a toluene solution was added to a 20 L-sus high pressure reactor, and 1,000 g of silica (Grace Davison, SP2412) was injected thereto, followed by stirring while raising the reactor temperature to 40° C. 2.8 kg of a 30 wt % methylaluminoxane(MAO)/toluene solution (Albemarle) was injected, and temperature was raised to 60° C., followed by stirring at 200 rpm for 12 hours. The reactor temperature was decreased to 40° C. Then, stirring was stopped, and the solution was allowed to settle for 10 minutes, followed by decantation of the reaction solution.

2.0 kg of toluene was injected into a reactor, and 30 g of the compound of Synthesis Example 1 and 1,000 mL of toluene solution were injected into the reactor, and temperature was raised to 85° C., followed by stirring for 90 minutes. The reactor temperature was decreased to 40° C., and then stirring was stopped. The solution was allowed to settle for 30 minutes, followed by decantation of the reaction solution. 2.0 kg of hexane was injected into the reactor, followed by decantation and drying at 80° C. for 3 hours.

3.0 kg of toluene was injected to the reactor, and 50 g of the compound of Synthesis Example 2-4 and 1,000 ml of toluene were injected into the reactor, followed by stirring 40° C. for 90 minutes.

The reactor temperature was decreased to room temperature, and stirring was stopped, and the solution was allowed to settle for 30 minutes, followed by decantation of the reaction solution. 3.0 kg of hexane was injected into the reactor, and then a hexane slurry solution was transferred to a 20 L filter dryer, and a hexane solution was filtered. The solution was dried under reduced pressure at 50° C. for 4 hours to prepare 1.50 kg of a SiO$_2$ hybrid supported catalyst.

Preparation Example 2

2.0 kg of a toluene solution was added to a 20 L-sus high pressure reactor, and 1,050 g of silica (Grace Davison, SP2412) was injected thereto, followed by stirring while raising the reactor temperature to 40° C. 3.3 kg of a 30 wt % methylaluminoxane(MAO)/toluene solution (Albemarle) was injected, and temperature was raised to 70° C., followed by stirring at 200 rpm for 6 hours. The reactor temperature was decreased to 40° C. Then, stirring was stopped, and the solution was allowed to settle for 10 minutes, followed by decantation of the reaction solution. 2.0 kg of toluene was injected into the reactor, and stirred for 10 minutes. Then, stirring was stopped, and the solution was allowed to settle for 10 minutes, followed by decantation of the reaction solution.

1,000 mL of toluene and 33 g of the compound of Synthesis Example 2-3 and 25 g of the compound of Synthesis Example 1 were injected into a 2,000 mL schlenk flask, and stirred at room temperature for 30 minutes. 2.0 kg of toluene was injected into the reactor, and the prepared schlenk flask reaction solution was injected into the reactor. The reactor temperature was raised to 85° C., followed by stirring for 90 minutes. The reactor temperature was decreased to 40° C., and then stirring was stopped. The solution was allowed to settle for 30 minutes, followed by decantation of the reaction solution.

2.0 kg of hexane was injected into the reactor, followed by decantation and drying at 80° C. for 3 hours. 3.0 kg of toluene was injected into the reactor, 20 g of the compound of Synthesis Example 2-1, and 1,000 mL of toluene solution were injected into the reactor, followed by stirring 40° C. for 90 minutes.

The reactor temperature was decreased to room temperature, and then stirring was stopped. The solution was allowed to settle for 30 minutes, followed by decantation of the reaction solution. 3.0 kg of hexane was injected into the reactor, and then a hexane slurry solution was transferred to a 20 L filter dryer, and a hexane solution was filtered. The solution was dried under reduced pressure at 50° C. for 4 hours to prepare 1.55 kg of a SiO$_2$ hybrid supported catalyst.

Comparative Preparation Example 1

3.0 kg of a toluene solution was added to a 20 L-sus high pressure reactor, and 1,200 g of silica (Grace Davison, SP2412) was injected thereto, followed by stirring while raising the reactor temperature to 40° C. Silica was sufficiently dispersed for 60 minutes, and then 7.5 kg of a 10 wt % methylaluminoxane(MAO)/toluene solution was injected, and temperature was raised to 80° C., followed by stirring at 200 rpm for 12 hours. The reactor temperature was decreased to 40° C. Then, stirring was stopped, and the solution was allowed to settle for 60 minutes, followed by decantation of the reaction solution. 3.0 kg of toluene was injected into the reactor, and stirred for 10 minutes. Then, stirring was stopped, and the solution was allowed to settle for 60 minutes, followed by decantation of the toluene solution.

2.0 kg of toluene was injected into the reactor, and 33.2 g of the compound of Synthesis Example 2-5 and 1,500 mL of toluene were put in a flask to prepare a solution, followed by sonication for 30 minutes. The compound of Synthesis Example 2-5/toluene solution thus prepared was injected into the reactor, followed by stirring at 200 rpm for 90 minutes. Stirring was stopped, and the solution was allowed to settle for 60 minutes, followed by decantation of the reaction solution.

2.0 kg of toluene was injected into the reactor, and 50.7 g of the compound of Synthesis Example 2-1 and 1,500 mL of toluene were put in a flask to prepare a solution, followed by sonication for 30 minutes. The compound of Synthesis Example 2-1/toluene solution thus prepared was injected into the reactor, followed by stirring at 200 rpm for 90 minutes. Stirring was stopped, and the solution was allowed to settle for 60 minutes, followed by decantation of the reaction solution.

2.0 kg of toluene was injected into the reactor, and 36.7 g of the compound of Synthesis Example 3 and 500 mL of toluene were put in a flask to prepare a solution, followed by sonication for 30 minutes. The compound of Synthesis Example 3/toluene solution thus prepared was injected into the reactor, followed by stirring at 200 rpm for 90 minutes. The reactor temperature was cooled down to room temperature, and then stirring was stopped, and the solution was allowed to settle for 60 minutes, followed by decantation of the reaction solution.

2.0 kg of toluene was injected into the reactor, followed by stirring for 10 minutes. Stirring was stopped, and the solution was allowed to settle for 60 minutes, followed by decantation of the toluene solution.

3.0 kg of hexane was injected into the reactor, and then a hexane slurry solution was transferred to a filter dryer, and a hexane solution was filtered. The solution was dried under reduced pressure at 50° C. for 4 hours to prepare 1,130 g of a SiO$_2$ hybrid supported catalyst.

Comparative Preparation Example 2

3.0 kg of a toluene solution was added to a 20 L-sus high pressure reactor, and 1,200 g of silica (Grace Davison, SP2412) was injected thereto, followed by stirring while raising the reactor temperature to 40° C. Silica was sufficiently dispersed for 60 minutes, and then 7.5 kg of a 10 wt % methylaluminoxane(MAO)/toluene solution was injected, and temperature was raised to 80° C., followed by stirring at 200 rpm for 12 hours. The reactor temperature was decreased to 40° C. Then, stirring was stopped, and the solution was allowed to settle for 60 minutes, followed by decantation of the reaction solution. 3.0 kg of toluene was injected into the reactor, and stirred for 10 minutes. Then, stirring was stopped, and the solution was allowed to settle for 60 minutes, followed by decantation of the toluene solution.

2.0 kg of toluene was injected into the reactor, and 30.5 g of the compound of Synthesis Example 2-3 and 1,500 mL of toluene were put in a flask to prepare a solution, followed by sonication for 30 minutes. The compound of Synthesis Example 2-3/toluene solution thus prepared was injected into the reactor, followed by stirring at 200 rpm for 90 minutes. Stirring was stopped, and the solution was allowed to settle for 60 minutes, followed by decantation of the reaction solution.

2.0 kg of toluene was injected into the reactor, and 10.3 g of the compound of Synthesis Example 2-2 and 1,500 mL of toluene were put in a flask to prepare a solution, followed by sonication for 30 minutes. The compound of Synthesis Example 2-2/toluene solution thus prepared was injected into the reactor, followed by stirring at 200 rpm for 90 minutes. Stirring was stopped, and the solution was allowed to settle for 60 minutes, followed by decantation of the reaction solution.

2.0 kg of toluene was injected into the reactor, and 36.7 g of the compound of Synthesis Example 3 and 500 mL of toluene were put in a flask to prepare a solution, followed by sonication for 30 minutes. The compound of Synthesis Example 3/toluene solution thus prepared was injected into the reactor, followed by stirring at 200 rpm for 90 minutes. The reactor temperature was cooled down to room temperature, and then stirring was stopped, and the solution was allowed to settle for 60 minutes, followed by decantation of the reaction solution. 2.0 kg of toluene was injected into the reactor, followed by stirring for 10 minutes. Stirring was stopped, and the solution was allowed to settle for 60 minutes, followed by decantation of the toluene solution.

3.0 kg of hexane was injected into the reactor, and then a hexane slurry solution was transferred to a filter dryer, and a hexane solution was filtered. The solution was dried under reduced pressure at 50° C. for 4 hours to prepare 850 g of a $SiO_2$ hybrid supported catalyst.

Example of Olefin Polymerization

Example 1

Ethylene-1-hexene copolymerization was carried out by using an isobutane slurry loop process continuous reactor (volume: 140 L). The reactor was operated at a reaction flow rate of about 7 m/s, and ethylene, hydrogen gas, and 1-hexene as a comonomer required for the polymerization were continuously injected at a constant rate. A reactor pressure was 40 bar and a polymerization temperature was 84° C.

Detailed polymerization conditions of Examples 1 to 6 are shown in the following Table 1, and polymerization conditions of Comparative Examples 1 to 3 are shown in the following Table 2.

TABLE 1

| Example No. | Example 1 | Example 2 | Example 3 | Example 4 | Example 5 | Example 6 |
| --- | --- | --- | --- | --- | --- | --- |
| Catalyst used | Preparation Example 1 | Preparation Example 1 | Preparation Example 1 | Preparation Example 1 | Preparation Example 2 | Preparation Example 2 |
| Injection amount of ethylene (kg/hr) | 25 | 25 | 25 | 25 | 22 | 22 |
| Injection amount of 1-hexene (wt %) | 8.7 | 8.8 | 8.5 | 8.5 | 18.2 | 15.0 |
| Injection amount of hydrogen (ppm) | 25 | 28 | 35 | 36 | 20 | 11 |
| Slurry density (g/L) | 550 | 548 | 543 | 544 | 554 | 550 |
| Catalytic activity (kgPE/kgSiO$_2$/hr) | 6.7 | 5.5 | 5.1 | 5.1 | 4.4 | 5.3 |
| Bulk density (g/mL) | 0.44 | 0.42 | 0.41 | 0.42 | 0.40 | 0.40 |
| Settling efficiency (%) | 60 | 49 | 48 | 49 | 53 | 50 |

TABLE 2

| | Comparative Example No. | | |
| --- | --- | --- | --- |
| | Comparative Example 1 | Comparative Example 2 | Comparative Example 3 |
| | Catalyst used | | |
| | Comparative Preparation Example 1 | Comparative Preparation Example 1 | Comparative Preparation Example 2 |
| Injection amount of ethylene (kg/hr) | 27 | 25 | 25 |
| Injection amount of 1-hexene (wt %) | 6.5 | 6.4 | 6.4 |
| Injection amount of hydrogen (ppm) | 135 | 186 | 188 |
| Slurry density (g/L) | 554 | 550 | 551 |
| Catalytic activity (kgPE/kgSiO$_2$/hr) | 3.6 | 4.2 | 4.3 |
| Bulk density (g/mL) | 0.48 | 0.47 | 0.48 |
| Settling efficiency (%) | 59 | 61 | 60 |

Comparative Example 4

LUCENE SP330 product of LG Chemical, which is a commercial mLLDPE prepared by a slurry loop polymerization process, was prepared.

Comparative Example 5

LUCENE SP310 product of LG Chemical, which is a commercial mLLDPE prepared by a slurry loop polymerization process, was prepared.

Comparative Example 6

LUCENE SP510 product of LG Chemical, which is a commercial mLLDPE prepared by a slurry loop polymerization process, was prepared.

Experimental Example

The polymers obtained from Examples 1 to 6 and Comparative Examples 1 to 6 were used to manufacture films by the following method. Physical properties thereof were measured, and the results are shown in Tables 3 and 4.

1) Density: ASTM 1505

2) Melt flow index (MI, 2.16 kg/10 min): at a measurement temperature of 190° C., ASTM 1238

3) Melt flow index (MI, 21.6 kg/10 min): at a measurement temperature 190° C., ASTM 1238

4) Melt strength (MS): A sample was connected to Rheotens of a capillary rheometer (Rheo-tester 2000 of Gottfert), and melt strength was measured five times under the following conditions. A mean value was taken.

Sample size: A pellet resin was put in a capillary die at a temperature of 190° C., and melted for 5 minutes. Then, the resin extruded at a constant piston speed of 5 mm/s was measured through Rheotens.

Capillary die size: Lo/Do=15
Distance from capillary die to rheothens wheel: 80 mm
Wheel acceleration: 12 mm/s$^2$ 5) Molecular weight and Molecular weight distribution: A number average molecular weight and a weight average molecular weight were measured at a measurement temperature of 160° C. by using HT-GPC (PL-GPC 220, Agilent), and a molecular weight distribution was expressed as a ratio of the weight average molecular weight to the number average molecular weight.

6) Film formation conditions: A film was formed by a film blowing method. A film formation temperature was 100° C. to 200° C. and BUR (blow up ratio) was 2.0 to 3.0.

7) Haze (%): Haze was measured according to ISO 13468. In this regard, a thickness of a specimen was 50 μm, and haze was measured ten times with respect to one specimen, and a mean value was taken.

TABLE 3

|  | Example 1 | Example 2 | Example 3 | Example 4 | Example 5 | Example 6 |
|---|---|---|---|---|---|---|
| MI (g/10 min) | 0.27 | 0.40 | 0.67 | 0.72 | 0.94 | 1.05 |
| Density (g/cm$^3$) | 0.926 | 0.927 | 0.927 | 0.927 | 0.921 | 0.921 |
| MFRR (MI$_{21.6}$/MI$_{2.16}$) | 74 | 69 | 59 | 62 | 40 | 37 |
| Molecular weight distribution (Mw/Mn) | 3.04 | 3.09 | 3.02 | 3.18 | 2.82 | 2.78 |
| Melt strength (mN) | 97 | 88 | 81 | 82 | 78 | 75 |
| Haze (%) | 17.1 | 16.0 | 15.6 | 12.1 | 10.6 | 11.0 |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| MI (g/10 min) | 0.40 | 0.55 | 0.60 | 0.72 | 1.02 | 3.5 |
| Density (g/cm$^3$) | 0.927 | 0.926 | 0.927 | 0.929 | 0.918 | 0.918 |
| MFRR (MI$_{21.6}$/MI$_{2.16}$) | 49 | 44 | 33 | 28 | 23 | 23 |
| Molecular weight distribution (Mw/Mn) | 6.10 | 5.11 | 3.55 | 3.11 | 2.93 | 2.81 |
| Melt strength (mN) | 78 | 72 | 66 | 63 | 57 | 34 |
| Haze (%) | 32.3 | 30.6 | 25.3 | 22.1 | 15.2 | — |

Figure 1:
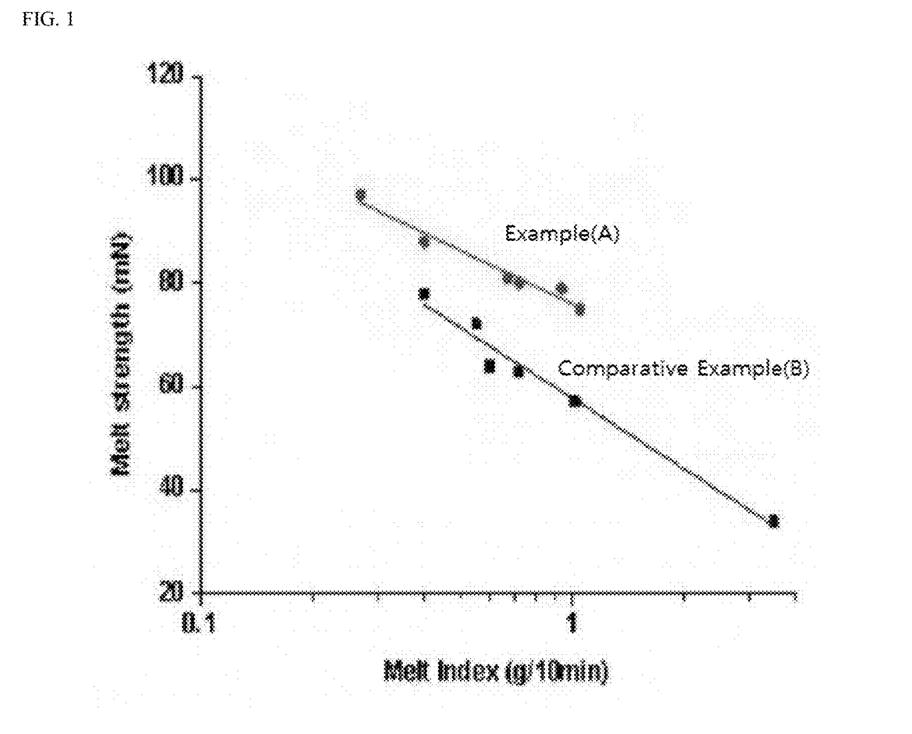
FIG. 1 is a graph showing a relationship between melt strength (MS) and melt flow index (MI) according to Examples and Comparative Examples of the present invention.
Figure 2:
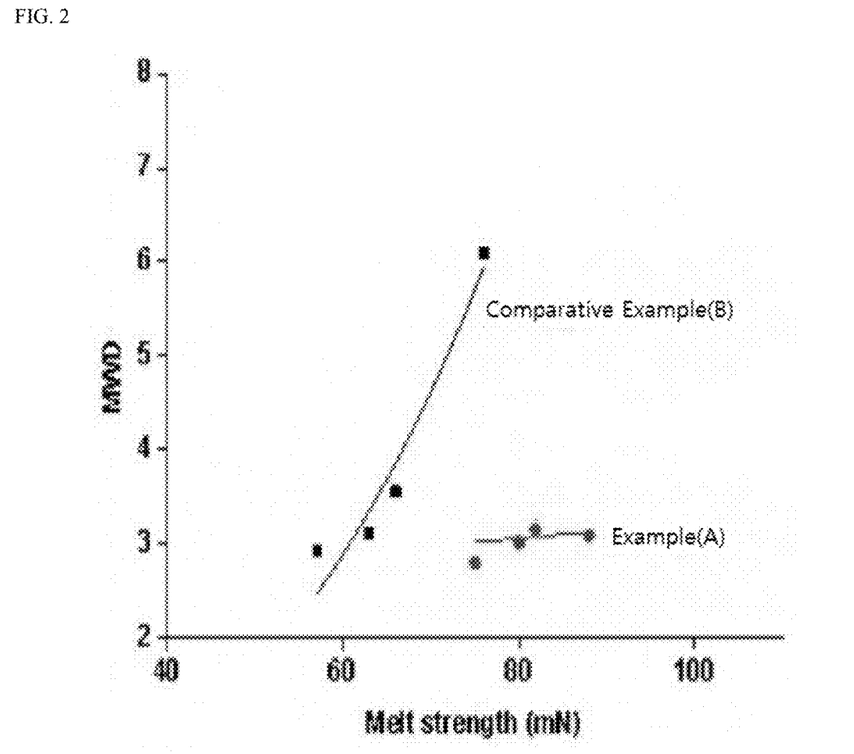
FIG. 2 is a graph showing a relationship between a molecular weight distribution and melt strength (MS) according to Examples and Comparative Examples of the present invention.

Further, with respect to the olefin-based polymers of Examples and Comparative Examples, a relationship between melt strength (MS) and melt flow index (MI) and a relationship between melt strength (MS) and molecular weight distribution are shown in graphs, respectively.

FIG. 1 is a graph showing a relationship between melt strength (MS) and melt flow index (MI) according to Examples and Comparative Examples of the present invention.

In FIG. 1, the red round dots correspond to Examples 1 to 6 in this order, and the black square dots correspond to Comparative Examples 1 to 6 in this order. Further, the red line (A) connects respective points of Examples, and the black line (B) connects respective points of Comparative Examples.

FIG. 2 is a graph showing a relationship between a molecular weight distribution and melt strength (MS) according to Examples and Comparative Examples of the present invention. In FIG. 2, the red round dots correspond to Example 6, Example 3, Example 4, and Example 2 in this order, and the black square dots correspond to Comparative Example 5, Comparative Example 4, Comparative Example 3, and Comparative Example 1 in this order. Further, the red line (A) connects respective points of Examples, and the black line (B) connects respective points of Comparative Examples.

Referring to Tables 3 and 4 and FIG. 1, all the olefin-based polymers of Examples according to the present invention showed that a relationship between melt strength (MS) and melt flow index (MI) satisfied the following Equation 1, whereas the olefin-based polymers of Comparative Examples did not.

$$-32.0*\log MI+75.2 \leq MS \leq -40.9*\log MI+77.9 \quad [\text{Equation 1}]$$

Referring to Tables 3 and 4 and FIG. 2, all the olefin-based polymers of Examples according to the present invention showed a molecular weight distribution (Mw/Mn) of 4 or less, when the melt strength (MS) was 70 m/N or more, whereas the olefin-based polymers of Comparative Examples did not satisfy this characteristic relationship between melt strength and molecular weight distribution.

What is claimed is:

1. An ethylene 1-hexene copolymer, wherein the numerical value of melt flow index (MI, g/10 min) measured at 190° C. under a load of 2.16 kg according to ASTM D1238 and the numerical value of melt strength (MS, mN) satisfy the following relationship:

$$-32.0*\log MI+75.2 \leq MS \leq -40.9*\log MI+77.9, \text{ and}$$

wherein the molecular weight distribution (Mw/Mn) of the olefin-based polymer is 2.78 to 3.18, and
wherein the copolymer is prepared by polymerizing ethylene in the presence of 8.5 to 18.2 wt % of 1-hexene.

2. The ethylene 1-hexene copolymer of claim 1, wherein the melt flow index (MI) is 0.27 g/10 min to 1.05 g/10 min, as measured at 190° C. under a load of 2.16 kg according to ASTM D1238.

3. The ethylene 1-hexene copolymer of claim 1, wherein a melt flow rate ratio (MFRR, MI$_{21.6}$/MI$_{2.16}$) is 37 to 74, as measured at 190° C. according to ASTM D1238.

4. The ethylene 1-hexene copolymer of claim 1, wherein the melt strength (MS) is 75 mN to 97 mN.

5. The ethylene 1-hexene copolymer of claim 1, wherein a density is 0.921 g/cc to 0.927 g/cc.

6. A film comprising the ethylene 1-hexene copolymer of claim 1.

7. The film of claim 6, wherein haze is 20% or less, as measured at a thickness of 50 μm according to ISO 13468.

* * * * *